United States Patent [19]
Alexander et al.

[11] Patent Number: 5,742,799
[45] Date of Patent: Apr. 21, 1998

[54] METHOD AND APPARATUS FOR SYNCHRONIZING MULTIPLE CLOCKS

[75] Inventors: Michael Alexander; Carmine Nicoletta; Arthur R. Piejko, all of Austin, Tex.

[73] Assignee: Motorola, Inc., Schaumburg, Ill.

[21] Appl. No.: 801,648

[22] Filed: Feb. 18, 1997

[51] Int. Cl.$^6$ ................................... G06F 1/12
[52] U.S. Cl. ........................................ 395/552
[58] Field of Search ........................ 395/551, 552; 327/141; 375/354, 356, 359, 362, 371, 373, 376

[56] References Cited

U.S. PATENT DOCUMENTS

| | | | |
|---|---|---|---|
| 4,785,469 | 11/1988 | Joshi et al. | 375/366 |
| 5,295,164 | 3/1994 | Yamamura | 375/376 |
| 5,410,263 | 4/1995 | Waizman | 327/141 |
| 5,450,458 | 9/1995 | Price et al. | 375/356 |

OTHER PUBLICATIONS

"A Dual PLL Based Multi Frequency Clock Distibution Scheme," Albert Thaik and Hai Ngoc Nguyen, IEEE Symposium on VLSI Circuits Digest of Technical Papers, pp. 84–85, 1992.

"A Variable Delay Line PLL for CPU–Coprocessor Synchronization," Mark G. Johnson and Edwin L. Hudson, IEEE Journal of Solid–State Circuits, vol. 23, No. 5, Oct. 1988.

Primary Examiner—Thomas M. Heckler

[57] ABSTRACT

A method and apparatus for synchronizing multiple busses having different cycle times in a data processing system (10). The present invention synchronizes multiple clocks having different phase and frequencies without redundant use of phase lock loop units. An initial unit (7) receives an external system clock having an initial phase and frequency. An internal clock (112) is generated which is a phase and frequency adjusted derivation of the system clock. From this internal clock (112) a global clock (101) for use within the data processor (10) is generated. A second unit (9) receives the internal clock (112) and performs phase adjustment to provide a peripheral clock (114). The provision of the internal clock (112) detaches the dependency of peripheral clock (114) generation from the global clock (101), while maintaining a phase relationship with the global clock (101). In one embodiment, the present invention is implemented without the costly use of multiple phase lock loops.

20 Claims, 4 Drawing Sheets

| (UNITS IN MHz) | | | | | | |
|---|---|---|---|---|---|---|
| SYSCLK | L | M | N | OSCILLATOR | GLOBAL CLOCK | INTERNAL PERIPHERAL CLOCK |
| 50 | 2 | 2 | 4 | 400 | 200 | 200 |
| 50 | 3 | 2 | 4 | 400 | 200 | 133.33 |
| 50 | 4 | 2 | 4 | 400 | 200 | 100 |
| 50 | 5 | 2 | 4 | 400 | 200 | 80 |
| 50 | 6 | 2 | 4 | 400 | 200 | 66.67 |
| 50 | 5 | 2 | 3.5 | 350 | 175 | 70 |

METHOD AND APPARATUS FOR SYNCHRONIZING MULTIPLE CLOCKS

FIELD OF THE INVENTION

The present invention relates generally to clock synchronization and specifically to synchronization of multiple clocks in a data processing system.

BACKGROUND OF THE INVENTION

As the complexity of microprocessor systems increases, additional techniques are necessary for interfacing between buses of differing frequencies. Traditionally, a microprocessor will receive a system clock from external to the microprocessor. The external system clock may be of a lower frequency than that of the desired global clock to be used within the microprocessor. The microprocessor must adjust for this difference. Initially, a phased locked loop (PLL) is used to increase the frequency from the system clock frequency to the global clock frequency. The microprocessor must interface with many modules and peripherals within a given system. In a modular system particularly, often there are inconsistent operating conditions governing individual components. The microprocessor must smooth this overall interface. Interfacing with modules within the microprocessor is done using regeneration units. The microprocessor must receive and generate a variety of frequencies to satisfy these system needs.

Systems often incorporate PLLs for synchronization of the global clock with the frequency of external busses. Within a system, multiple buses may operate at different frequencies. The different frequencies are often of integer and/or non-integer ratios. Additionally, it is often necessary to further synchronize the microprocessor with peripheral units having still other frequencies. For example, memory units such as random access memory (RAM) are interfaced using additional PLLs. A complex system may require many such PLL arrangements.

A PLL is used for synchronizing both phase and frequency of two signals. However, often only frequency adjustment is necessary to interface with the RAM memories. This illustrates one of the drawbacks of PLL application. In addition to this overuse of the PLL as a synchronization tool, PLLs are inherently unstable, and may detract from a system's reliability. There exists a need for a stable method of synchronizing two dissimilar buses to a single reference, where the frequencies are of integer and/or non-integer ratios.

DETAILED DESCRIPTION OF A PREFERRED EMBODIMENT

Figure 1:
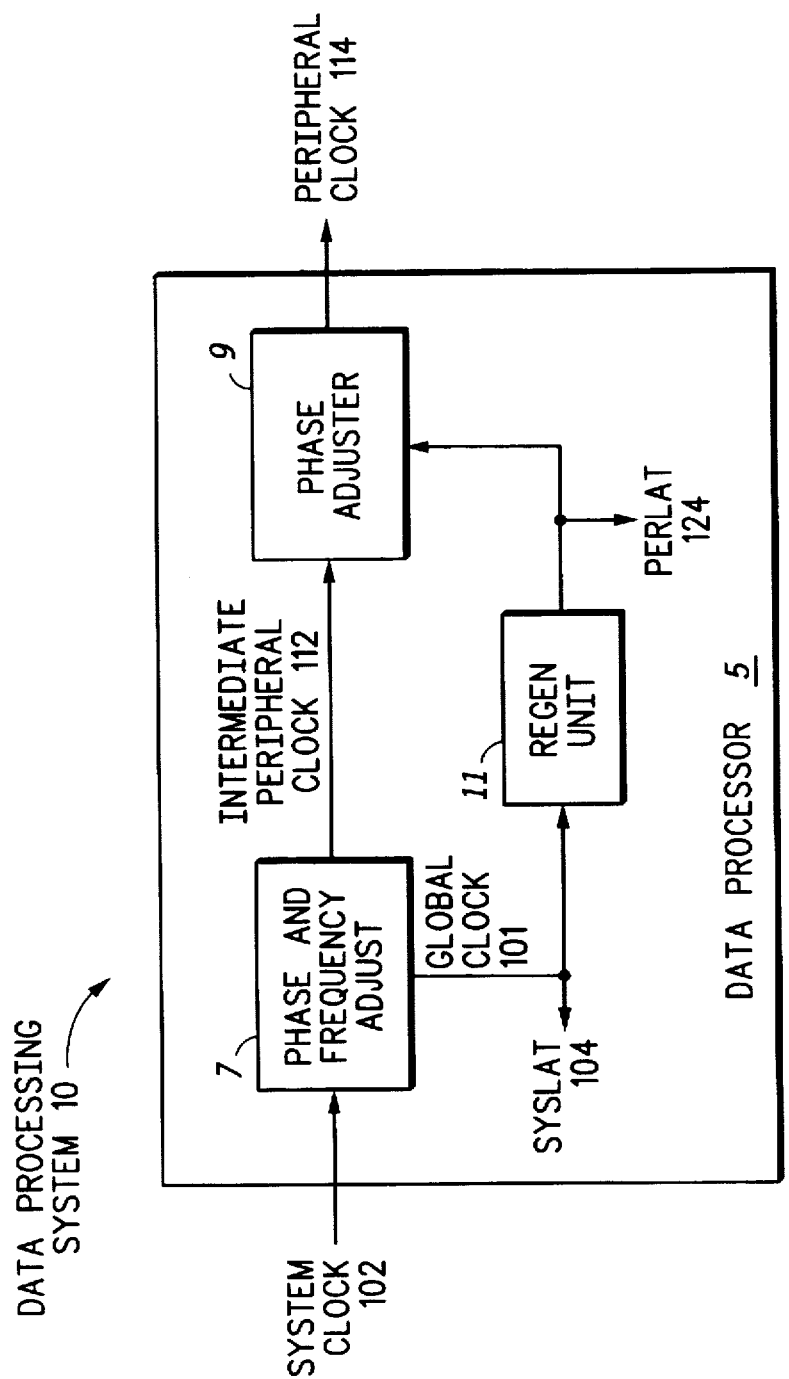
FIG. 1 illustrates in block diagram form a data processing system according to one embodiment of the present invention.

The present invention can be more fully described with reference to FIGS. 1–5. FIG. 1 illustrates data processing system 10 according to one embodiment of the present invention. Data processor 5 receives system clock signal 102 from within data processing system 10. System clock 102 is provided to phase and frequency adjust 7, which is then coupled to phase adjuster 9. Phase and frequency adjust 7 provides intermediate peripheral clock 112 to phase adjuster 9. Phase and frequency adjust 7 is also coupled to clock regeneration (REGEN) unit 11, providing global clock signal 101 to REGEN unit 11. Note that the global clock 101 is also provided to system latches, represented here as SYSLAT 104. REGEN 11 then is coupled to phase adjuster 9 providing a reference signal to phase adjuster 9. Note that the reference signal is also available to internal latches within data processor 5, represented as PERLAT 124. The output of phase adjuster 9 is peripheral clock signal 114.

Figure 2:
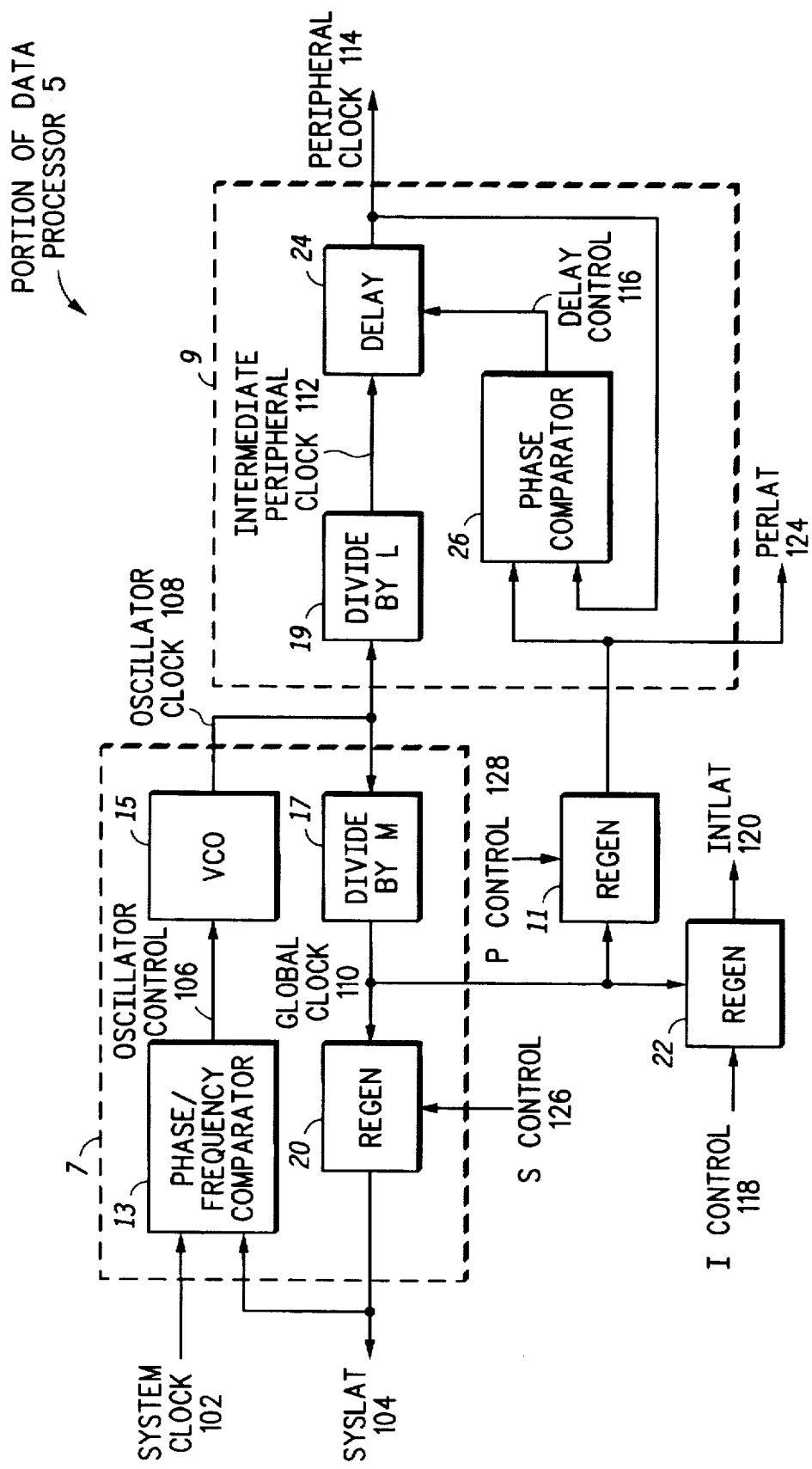
FIG. 2 illustrates in block diagram form a phase and frequency synchronization portion of one embodiment of the data processing system of FIG. 1.

FIG. 2 illustrates a portion of data processor 5 according to one embodiment of the present invention. The apparatus includes phase and frequency adjust 7, phase adjuster 9, and clock regeneration blocks (REGEN) 11 and 22. Phase and frequency adjust 7 includes phase/frequency comparator 13, voltage controlled oscillator (VCO) 15, first clock regeneration block (REGEN) 20, and dividing block (DIVIDE BY M) 17. The functionality of the circuit in FIG. 2 is better understood by referring to the timing diagram of FIG. 3.

Phase/frequency comparator 13 receives system clock 102 and is coupled to SYSLAT 104. Phase/frequency comparator 13 compares the frequency and phase of system clock 102 with the frequency and phase produced by SYSLAT 104 to produce oscillator control 106. In performing the comparison, system clock 102 is used as the reference signal. The goal is to align the phase of SYSLAT 104 to the phase of system clock 102. VCO 15 generates oscillator clock 108 based on oscillator control 106. Oscillator control 106 controls the frequency of oscillation of VCO 15. Note that in the present embodiment, oscillator clock 108 is of greater frequency than system clock 102. In one embodiment, oscillator clock 108 is eight times the frequency of system clock 102.

Figures 3, 4:
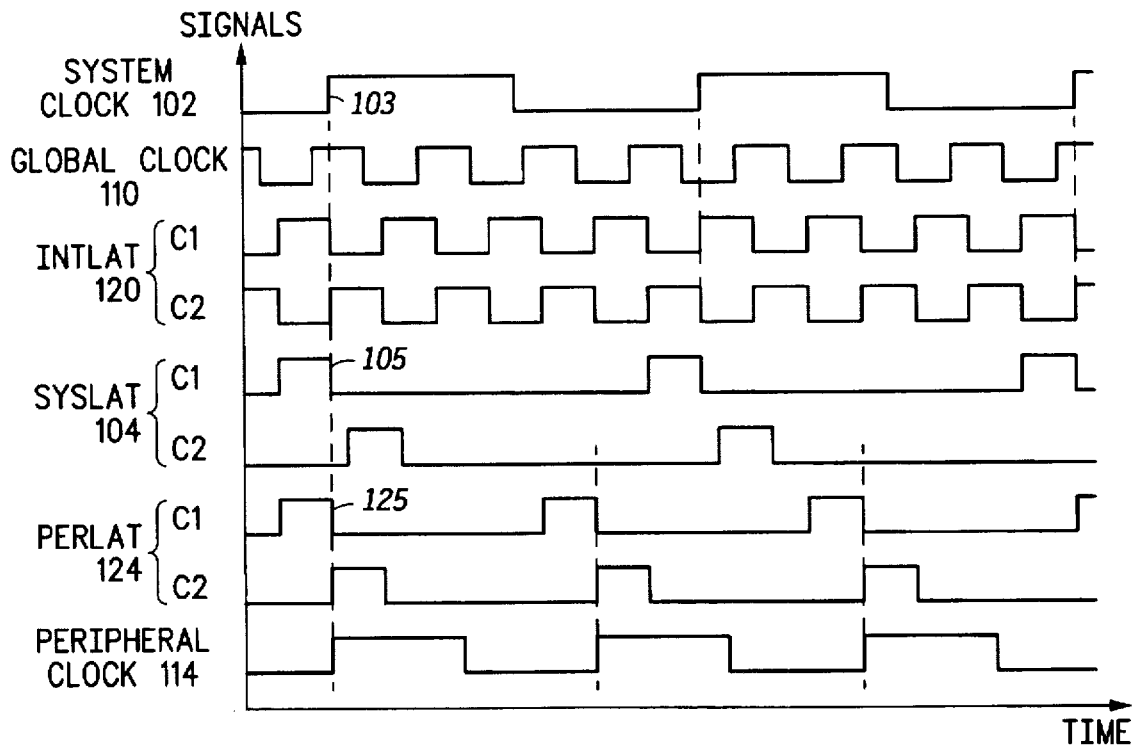
FIG. 3 illustrates in timing diagram form one example of the operational timing associated with the embodiment of FIG. 2.
FIG. 4 illustrates in tabular form the parameters used in the embodiment of FIG. 2.

Dividing block 17 receives oscillator clock 108 and divides it by a first integer "M" to produce global clock 110. A discussion of the value of M, as well as other value determinations, is given below and is illustrated in the table provided in FIG. 4. REGEN 20 receives global clock 110. In response to global clock 110 and S CONTROL 126, REGEN 20 provides a signal to SYSLAT 104. Note that the signal associated with SYSLAT 104 is composed of two signals, C1 and C2, which are standard timing signals used in latch-based systems. The signal C1 is the master clock signal and the signal C2 is the slave clock signal. As illustrated in FIG. 3, the C1 portion of SYSLAT 104 has falling edge 105 which is synchronized to rising edge 103 of system clock 102. The feedback path completed by SYSLAT 104 allows phase and frequency adjust 7 to produce additional clock signals of higher frequency than system clock 102, while maintaining phase consistent with system clock 102.

In the preferred embodiment, REGEN 20 filters global clock 110. Filtering is controlled by the S CONTROL 126, which aligns the edges of SYSLAT 104 to the edges of system clock 102. Essentially, the filtering process allows certain portions of global clock 110 to pass in order to create the desired signal for SYSLAT 104. FIG. 3 illustrates a filtering system where the frequency of global clock 110 is effectively divided by three and one-half to produce a signal for SYSLAT 104. This divisor is indicated by the variable "N". Note that a certain amount of delay is also introduced by REGEN 20. Ideally, the frequency of the signal associated with SYSLAT 104 will match the frequency of system clock 102, allowing frequency and phase comparison within phase/frequency comparator 13.

Second clock regeneration (REGEN) block 11 receives global clock 110 and peripheral control (P CONTROL) 128. REGEN 11 produces peripheral clock latch (PERLAT) 124 in response to receiving global clock 110 and P CONTROL 128. As can be seen in FIG. 3, falling edge 125 of the C1 component of PERLAT 124 is synchronized with rising edge 103 of system clock 102. REGEN 11 operates in the same way as discussed above for the REGEN 20. Certain portions of global clock 110 are allowed to pass, reducing the frequency of the signal and incurring a delay. In one embodiment of the present invention, delays introduced by REGEN 20 and 11 are matched such that the edges are synchronized at specific intervals. Note that in alternate embodiments, the edges are synchronized by adjusting these delays according to various schemes.

Phase adjuster 9 includes a second dividing block (DIVIDE BY L) 19, DELAY 24, and phase comparator 26. Dividing block 19 divides oscillator clock 108 by a second integer "L" to produce intermediate peripheral clock 112. In one embodiment, intermediate peripheral clock 112 will be a clock signal having a 50 percent duty cycle, which is required by many peripheral blocks, such as memory blocks. Thus, intermediate peripheral clock 112 is of the proper frequency for interaction with a peripheral device, but it is desirable to synchronize it with system clock 102. This is accomplished by DELAY 24, which delays intermediate peripheral clock 112 based on delay control 116. Delay control 116 is generated by phase comparator 26. Phase comparator 26 compares the phase of PERLAT 124 with the phase of peripheral clock 114, which is the output of DELAY 24. The peripheral clock signal is provided as a feedback input to phase comparator 26. The output of phase comparator 26 provides a control signal to delay 24. Note that the output from REGEN 11, 20, 22, specifically PERLAT, SYSLAT, INTLAT, each include both a master and a slave clock signal. Note that commonly the master and slave clock signal are referred to as C1 and C2, respectively.

To match the frequency of PERLAT 124 to the frequency of peripheral clock 114, the frequency division of REGEN 11 is set to L/M. Because PERLAT 124 is phase synchronized with system clock 102, aligning the phase of the peripheral clock 114 with the phase of PERLAT 124 results in the phase of peripheral clock 114 tracking the phase of system clock 102. System clock 102 is phase synchronized with global clock 110 and therefore peripheral clock 114 will also track the phase of global clock 110. Phase comparator 26 generates delay control 116 based on the relationship of PERLAT 124 and peripheral clock 114. Phase comparator 26 provides that intermediate peripheral clock 112 is appropriately delayed in DELAY 24 to align peripheral clock 114 with system clock 102 and other clocks in the apparatus.

The divisors L and M are adjusted according to the desired frequency of peripheral clock 114. In one embodiment of the present invention, L and M are integer values. Flexibility of design is enhanced as the values of L and M may be adjusted to affect a peripheral clock 114 which is an integer or a non-integer multiple of global clock 110. The multiple is reflected by the ratio of M to L. Further discussion of the values L and M is given below in the discussion of FIG. 4.

In one embodiment, the apparatus includes a third clock regeneration (REGEN) block 22, which receives global clock 110 and internal control (I CONTROL) 118. REGEN 22 produces an internal clock latch (INTLAT) 120 based on received global clock 110 and I CONTROL 118. As illustrated in FIG. 3, INTLAT 120 is of the same frequency as global clock 110, however, INTLAT 120 is phase aligned to system clock 102 and peripheral clock 114. In alternate embodiments, global clock 110 may be filtered in a manner similar to that of REGEN 20 and 11 such that the frequency of the INTLAT 120 is a derivative of the frequency of global clock 110. Typically, INTLAT 120 is used to clock internal latches of the apparatus, where the frequency at which the internal latches operate is a multiple of system clock 102.

In one embodiment of the present invention, system clock 102 is provided by a system bus which interfaces with the apparatus. Data is then exchanged between the system bus and the circuitry internal to the apparatus. Because SYSLAT 104 is effectively synchronized with system clock 102 and INTLAT 120, which clocks the internal latches of the apparatus, data exchange may be accomplished in a synchronous manner. Synchronous operation avoids many problems associated with exchanging data across an asynchronous interface. Similarly, peripheral clock 114 may be used to access a peripheral device, which in one embodiment is an external RAM. Because PERLAT 124 is synchronized to both peripheral clock 114 and INTLAT 120, synchronous data exchange is possible.

From an overall perspective, the system of FIG. 2 incorporates VCO 15 to produce oscillator clock 108, which is then divided to produce global clock 110. Oscillator clock 108 tracks the phase and frequency of system clock 102, where tracking is accomplished by way of a feedback path. Therefore, clocks derived from oscillator clock 108, such as global clock 110, also track system clock 102. Taking advantage of phase alignment, additional clocks are then derived from global clock 110. A derived clock has edges which track edges of system clock 102, but may be of different frequency. An example derivative clock is PERLAT 124. PERLAT 124 is used to phase align intermediate peripheral clock 112. Intermediate peripheral clock 112 has a 50 percent duty cycle derived from oscillator clock 108, and is used to produce peripheral clock 114. Additional blocks similar to phase adjuster 9 and REGEN 11 could be added to the system to generate additional clocks that may be used for other peripheral devices.

Note that frequency adjustment of peripheral clock 114 is not required, only phase alignment. Prior techniques have employed elements such as phase locked loops (PLLs) to generate additional clocks of a desired phase and frequency. The PLL approach is costly and may be considered overkill for applications where only phase alignment is necessary. Additionally, the presence of multiple PLLs in close proximity to one another often adversely affects the operation of each PLL due to PLL noise. Using the technique described herein, costly solutions such as PLLs can be avoided and replaced with a block that aligns the phase of two signals without adjusting the frequency.

The associated timing diagram of the operation of the portion of data processor illustrated in FIG. 2 is described in FIG. 3, where signals are given as a function of time and with respect to system clock 102. Note that in typical operation, global clock 110 is provided throughout data processor 5. Global clock 110 is a multiple of system clock 102. Note that the signals associated with INTLAT 120, SYSLAT 104 and PERLAT 124 are each comprised of a C1 and C2 signal. The C1 and C2 signals of FIG. 3 are synchronized to system clock 102.

Here, peripheral clock 114, global clock 110 and system clock 102 are each of different frequency. Peripheral clock 114 is synchronized to system clock 102, and is a multiple of global clock 110. The example illustrated in FIG. 3 is a system according to the parameters given in the table of FIG. 4.

Referring to FIG. 4, the table includes six possible scenarios as examples of the operation of the present invention according to one embodiment. Initially, system clock 102 is provided from external. The value of system clock 102 is given as "SYSCK" in the first column of FIG. 4. For all cases considered in FIG. 4, SYSCK is 50 MHz. Global clock 110 is the internal clock used throughout data processor 5. The value of N is adjusted to affect the desired global clock 110. The value of N is calculated according to:

$$f_{system\ clock} * N = f_{global\ clock}$$

and is given for each case in FIG. 4. The values of L and M are used to derive internal peripheral clock 114. The relationship of internal peripheral clock 114 to global clock 110 is given as:

internal peripheral clock=global clock*(M/L)

and each of these values is given in FIG. 4 for each case. Note that this relationship does not limit the synchronization to integer and half-integer modes. Further, the relationship between VCO 15 and system clock 102 is given as:

$$f_{system\ clock} = \frac{f_{VCO}}{(M * N)}$$

where $f_{VCO}$ represents the oscillation of VCO 15. The portion of data processor 5 illustrated in FIG. 2 is configured according to the above relationships to affect the necessary clocks both internal to data processor 5 and for interface with peripherals and other modules.

Consider the parameters given in the bottom row of the table of FIG. 4. These parameters are applied to the portion of data processor 5 illustrated in FIG. 2. In this system, system clock 102 is operating at 50 MHz, L is a value of 5, M is a value 2 and N is a value 3.5. Note that L is the value of the divide ratio for dividing block 19. M is the value of the divide ratio used in dividing block 17. N is a value used in REGEN 20 for generating output. The output of VCO 15 is a signal at 380 MHz. Note that the frequency of intermediate peripheral clock 112 and the frequency of global clock 110 are determined by oscillator clock 108, where oscillator clock 108 is the output of VCO 15. The frequency of global clock 110 is determined by the divisor of dividing block 17 (i.e. M) and is here defined as 2. The global clock, GCLK, is provided at 175 MHz. Note that the output of phase adjuster 9 is peripheral clock signal. Peripheral clock signal is at the same frequency as the intermediate peripheral clock signal which in this example is at 70 MHz.

FIG. 4 illustrates several examples of possible system clock, L, M, N, oscillator combinations. Note that in one embodiment of the present invention, VCO 15 oscillator frequency is determined by multiplying system clock 102 frequency by M, and then multiplying this value by N. Global clock 110 frequency is determined by dividing VCO 15 oscillator frequency by M. Internal peripheral clock 114 frequency is determined by dividing VCO 15 oscillator frequency by L.

Figure 5:
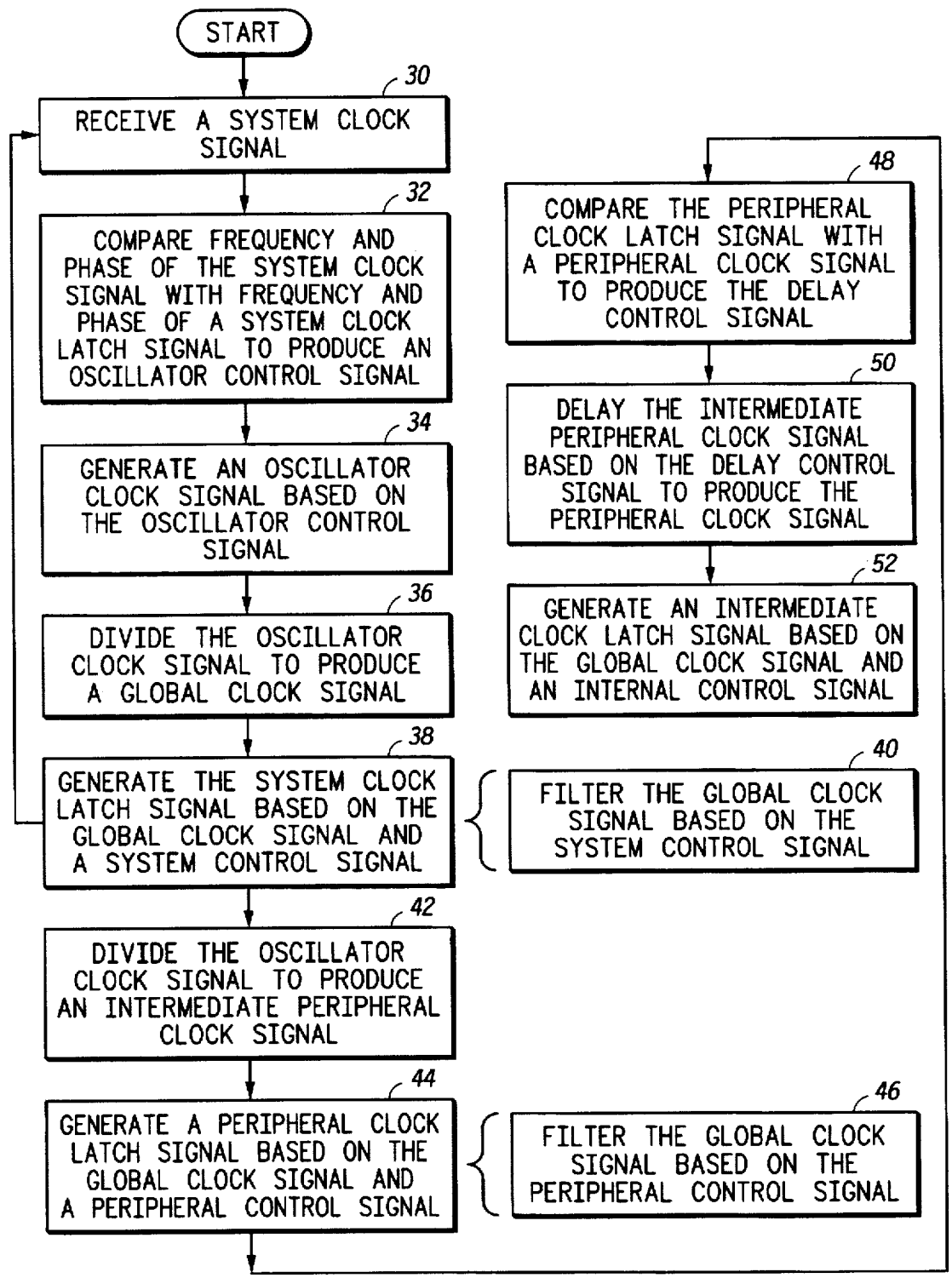
FIG. 5 illustrates in flow chart form a method for synchronizing multiple clocks in accordance with the present invention.

FIG. 5 illustrates, in flow chart form, a method for synchronizing multiple clocks. Beginning at step 30, system clock 102 is received by data processor 5. At step 32, the frequency and phase of system clock 102 is compared with the frequency and phase of system clock latch signal and an oscillator control signal 106 is produced based on the comparison. In the present embodiment, the system clock latch signal is associated with SYSLAT 104. At step 34, the oscillator control signal is used to generate oscillator clock 108, and the frequency and phase of oscillator clock 108 are adjusted based on the oscillator control 106. Typically, this is performed using VCO 15, and the resultant oscillator clock 108 has a frequency greater than system clock 102. In one embodiment, the frequency of oscillator clock 108 may be a multiple or half-integer multiple of the frequency of system clock 102.

At step 36, oscillator clock 108 is divided by a first integer to produce global clock 110. At step 38, the system clock latch signal is generated based on global clock 110 as well as a system control signal, S CONTROL 126. This may be accomplished by filtering global clock 110 according to the system control signal of step 40, where the system control signal determines a portion of global clock 110 to be passed in order to form the system clock latch signal. In one embodiment, the system clock latch signal tracks system clock 102 in phase and in frequency, but does not have the same duty cycle.

At step 42, oscillator clock 108 is divided by a second integer to produce intermediate peripheral clock 112. In one embodiment, intermediate peripheral clock 112 has a 50 percent duty cycle, and is not phase aligned with system clock 102. At step 44, a peripheral clock latch signal is generated based on global clock 110 as well as a peripheral control signal, P CONTROL 128. In one embodiment, generation of the peripheral clock latch signal is accomplished at step 46, where global clock 110 is filtered according to the peripheral control signal in a manner similar to that described above in step 40. In one embodiment, the peripheral clock latch signal matches intermediate peripheral clock 112 in frequency, but has different duty cycle and phase alignment. In order to match the frequencies of the two signals, filtering of global clock 110 includes division of the frequency of global clock 110 by a ratio of the second integer to the first integer. The peripheral clock latch signal tracks system clock 102 with respect to phase, and a portion of the edges of the peripheral clock latch signal is synchronized with a portion of the edges in system clock 102.

At step 48, the phase of the peripheral clock latch signal is compared with the phase of peripheral clock 114, and a delay control signal 116 is generated based on the comparison. Delay control 116 is used at step 50 to control a delay of intermediate peripheral clock 112 sufficient to produce peripheral clock 114 phase aligned with the peripheral clock latch signal. Because peripheral clock 114 is phase aligned with the peripheral clock latch signal, it also tracks system clock 102 in phase and a portion of the edges of peripheral clock 114 are synchronized with a portion of the edges of system clock 102.

In one embodiment, at step 52 an internal clock latch signal is generated based on global clock 110 and an internal control signal, where the internal clock latch signal is phase aligned with peripheral clock 114 and system clock 102.

In conclusion, the present invention offers an efficient method of interfacing clocks of differing frequency and phase within a data processing system. The method does not limit synchronization to integer and half-integer ratios, but offers a flexible interface. In one embodiment of the present invention, a phase and frequency adjustment is coupled with a phase only adjustment to synchronize a data processor to a system clock and to a peripheral bus, where all are operating at different frequencies. While the present invention has been illustrated and described with reference to specific embodiments, further modifications and improvements will occur to those skilled in the art it is to be understood, therefore, that this invention is not limited to the particular forms illustrated and that the appended claims cover all modifications that do not depart from the scope of this invention.

We claim:

1. An apparatus for synchronizing multiple clocks, the apparatus comprising:

a voltage controlled oscillator that receives an oscillator control signal and generates an oscillator clock signal having frequency based on the oscillator control signal;

a first dividing block operably coupled to the voltage controlled oscillator, the first dividing block dividing the oscillator clock signal by a first integer to produce a global clock signal;

a first clock regeneration block operably coupled to the first dividing block, the first clock regeneration block receiving a system control signal, the first clock regeneration block producing a system clock latch signal based on the global clock signal and the system control signal;

a phase/frequency comparator operably coupled to the first clock regeneration block and the voltage controlled oscillator, the phase/frequency comparator receiving a system clock signal and comparing frequency and phase of the system clock signal with frequency and phase of the system clock latch signal to produce the oscillator control signal;

a second dividing block operably coupled to the voltage controlled oscillator, the second dividing block dividing the oscillator clock signal by a second integer to produce an intermediate peripheral clock signal;

a second clock regeneration block operably coupled to the first dividing block, the second clock regeneration block receiving a peripheral control signal and producing a peripheral clock latch signal based on the global clock signal and the peripheral control signal;

a phase comparator operably coupled to the second clock regeneration block, the phase comparator receiving a peripheral clock signal and comparing phase of the peripheral clock signal with phase of the peripheral clock latch signal to produce a delay control signal; and a delay block operably coupled to the second dividing block and the phase comparator, the delay block delaying the intermediate peripheral clock signal based on the delay control signal to produce the peripheral clock signal such that the peripheral clock signal tracks phase of the global clock signal and phase of the system clock signal.

2. The apparatus of claim 1, wherein the first integer and the second integer are greater than one.

3. The apparatus of claim 2, wherein the first generation block further comprises circuitry which filters the global clock signal based on the system control signal such that the positive edges of the system latch control signal correspond to positive edges of the system clock signal.

4. The apparatus of claim 2, wherein the second generation block further comprises circuitry which filters the global clock signal based on the peripheral control signal such that the positive edges of the peripheral latch control signal correspond to positive edges of the peripheral clock signal.

5. The apparatus of claim 4, wherein the frequency of the peripheral clock signal is a half-integer multiple of a frequency of the global clock signal, wherein the half-integer multiple is equal to the ratio of the first integer and the second integer.

6. The apparatus of claim 1 further comprising, a third clock regeneration block operably coupled to the second dividing block, wherein the third clock regeneration block receives an internal control signal, and wherein the third clock generation block produces a internal clock latch signal based on the global clock signal and the internal control signal, wherein the internal clock latch signal is phase aligned to the system clock signal and the peripheral clock signal.

7. The apparatus of claim 6, wherein the internal clock latch signal is used to clock internal latches of the apparatus, wherein the internal latches operate at an internal frequency which is a multiple of a frequency of the system clock.

8. A method for synchronizing multiple clocks, the method comprising the steps of:

receiving a system clock signal;

comparing frequency and phase of the system clock signal with frequency and phase of a system clock latch signal to produce an oscillator control signal;

generating an oscillator clock signal based on the oscillator control signal, wherein frequency and phase of the oscillator clock signal is adjusted based the oscillator control signal;

dividing the oscillator clock signal by a first integer to produce a global clock signal;

generating the system clock latch signal based on the global clock signal and a system control signal;

dividing the oscillator clock signal by a second integer to produce an intermediate peripheral clock signal;

generating a peripheral clock latch signal based on the global clock signal and a peripheral control signal;

comparing phase of the peripheral clock latch signal with phase of a peripheral clock signal to produce a delay control signal; and delaying the intermediate peripheral clock signal based on the delay control signal to produce the peripheral clock signal such that the phase of the peripheral clock signal tracks phase of the global clock signal and phase of the system clock signal.

9. The method of claim 8, wherein the step of generating the peripheral clock latch signal further comprises filtering the global clock signal based on the peripheral control signal such that positive edges of the peripheral latch control signal correspond to positive edges of the peripheral clock signal.

10. The method of claim 9, wherein the peripheral control signal is based on the ratio of the first integer to the second integer, and wherein frequency of the peripheral clock signal is a half-integer multiple of the frequency of the global clock signal, wherein the half-integer multiple is equal to the ratio of the first integer to the second integer.

11. The method of claim 8 further comprises the step of generating an internal clock latch signal based on the global clock signal and an internal control signal, wherein the internal clock latch signal is phase aligned to the system clock signal and the peripheral clock signal.

12. A method of synchronizing multiple clocks, the method comprising the steps of:

receiving a first clock signal;

converting the first clock signal to a second clock signal;

converting the first clock signal to a fourth clock signal, the fourth clock signal having a same phase delay as the first clock signal and having a same frequency as the second clock signal the fourth clock signal having a different phase delay than the second clock signal;

adjusting the second clock signal to have the same phase delay as the fourth clock signal; and providing a fifth clock signal, the fifth clock signal having the frequency of the second clock signal and having the phase delay of the fourth clock signal.

13. A method as in claim 12, wherein the step of converting the first clock signal to the second clock signal further comprises the steps of:

frequency adjusting the first clock signal to a third clock signal, the third clock signal having a greater frequency than the first clock signal; and dividing the third clock signal to provide the second clock frequency.

14. A method as in claim 12, wherein the step of converting the first clock signal to a fourth clock signal further comprises the steps of:

dividing the third clock signal to a sixth clock signal; and regenerating the sixth clock signal to provide the fourth clock signal, the fourth clock signal and the sixth clock signal having different phase delays.

15. A method of synchronizing a system clock signal and a peripheral clock signal to a global clock signal, the system clock signal, the global clock signal, and the peripheral clock signal having different frequencies, the method comprising the steps of:

receiving the system clock signal;

performing phase and frequency synchronization on the system clock signal to provide an intermediate peripheral clock signal;

performing phase and frequency synchronization on the system clock signal to provide the global clock signal; and performing phase adjustment on the intermediate peripheral clock signal as a function of the global clock signal to provide the peripheral clock signal.

16. A data processor, comprising:

a first adjustment unit, the first adjustment unit receiving a system clock signal from external at a first frequency and a first phase;

a signal regeneration unit coupled to the first unit, the first unit providing a global clock signal at a second frequency and a second phase to the signal regeneration unit, the signal regeneration unit providing a reference clock signal, the reference clock signal having a third frequency and the first phase;

a second adjustment unit coupled to the first unit, the first unit providing an intermediate peripheral clock signal to the second unit, the intermediate peripheral clock signal having the third frequency and a third phase, the second unit receiving the reference clock signal, the second unit providing a peripheral clock signal having the third frequency and the first phase.

17. A data processor as in claim 16, wherein the first adjustment unit comprises:

a phase locked loop, the phase locked loop receiving the system clock signal, the phase locked loop having a first divide ration, the phase locked loop generating the global clock signal according to the first divide ratio; and a frequency divider unit coupled to the phase locked loop, the frequency divider unit having a second divide ratio, the frequency divider unit providing the intermediate peripheral clock signal according to the second divide ratio.

18. A data processor as in claim 17, wherein the regeneration unit has a third divide ratio, the regeneration unit providing the reference clock signal according to the third divide ratio.

19. A data processor as in claim 18, wherein the third divide ratio is a function of the first divide ratio and the second divide ratio.

20. A data processing system, the data processing comprising:

a central processing unit, the central processing unit receiving a global clock signal;

a first synchronization unit coupled to the central processing unit, the first synchronization unit receiving a system clock signal, the first synchronization unit providing an intermediate clock signal which is a phase and frequency synchronized derivation of the system clock signal, the first synchronization unit providing the global clock signal which is a multiple of the intermediate clock signal;

a second synchronization unit coupled to the first synchronization unit, the second synchronization unit receiving the intermediate clock signal from the first synchronization unit, the second synchronization unit providing an output clock signal which is a phase synchronized derivation of the intermediate clock signal; and a regeneration unit coupled to the first synchronization unit; the regeneration unit receiving the global clock signal from the first synchronization unit, the regeneration unit providing a latch signal to the second synchronization unit for phase synchronizing with the global clock signal;

wherein the intermediate clock signal is phase and frequency synchronized with the system clock signal; and wherein the output clock signal is phase synchronized with the global clock signal.

* * * * *

UNITED STATES PATENT AND TRADEMARK OFFICE
CERTIFICATE OF CORRECTION

PATENT NO: 5,742,799

DATED: April 21, 1998

INVENTORS: Michael Alexander, et al

It is certified that an error appears in the above-identified patent and that said Letters Patent is hereby corrected as shown below:

Column 8, line 64: Add a comma (,) after "second clock signal"

Signed and Sealed this

Sixth Day of October, 1998

Attest:

BRUCE LEHMAN

Attesting Officer

Commissioner of Patents and Trademarks